J. A. ANDERSON.
Car-Trucks.

No. 158,563.  Patented Jan. 12, 1875.

Witnesses.  
Frank R. Tibbitts  
Henry B. Tibbitts, Jr

Inventor.  
James Albert Anderson  
Per Geo. W. Tibbitts  
atty.

UNITED STATES PATENT OFFICE.

JAMES A. ANDERSON, OF CLEVELAND, OHIO.

IMPROVEMENT IN CAR-TRUCKS.

Specification forming part of Letters Patent No. 158,563, dated January 12, 1875; application filed October 28, 1874.

*To all whom it may concern:*

Be it known that I, JAMES A. ANDERSON, of Cleveland, in the county of Cuyahoga and State of Ohio, have invented an Improved Coal-Car Truck, of which the following is a specification:

This invention relates to certain improvements in trucks for coal cars or wagons used at mines; and consists of a car-truck provided with boxes of peculiar construction for receiving the wheel-axle, as hereinafter fully shown and described.

To enable others to fully understand my invention I will proceed to describe the same by the aid of the accompanying drawing, in which—

Figure 1:
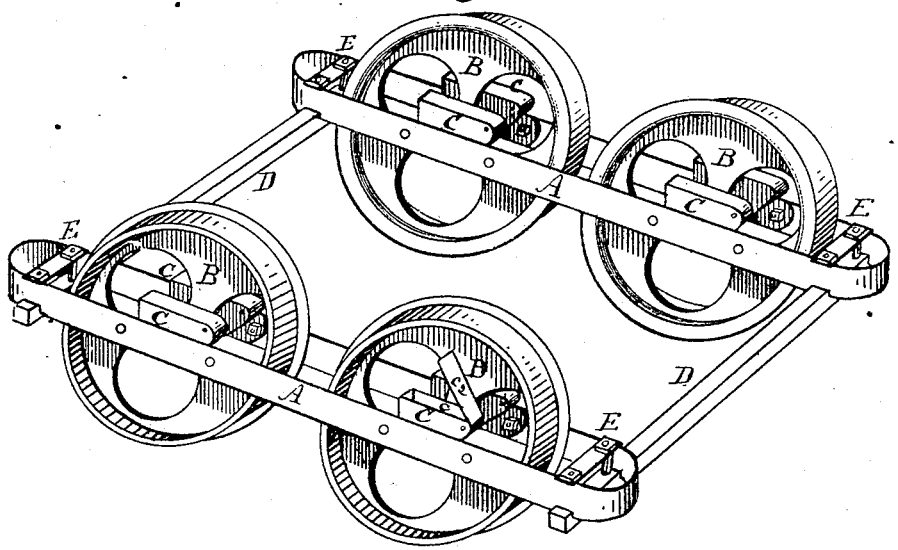
Figure 3:
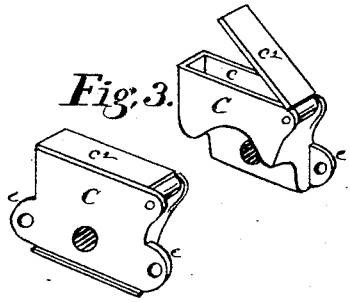
Figure 2:
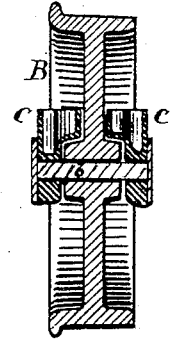

Figure 1 is a perspective view of the said truck. Fig. 2 is a vertical section of a wheel, showing the relation of the boxes to the hub. Fig. 3 is a detached view of two of the boxes.

A represents a frame made of flat bar-iron long enough and just wide enough to embrace two wheels, B B, conveniently. C C represent a pair of cast boxes, seen detached in Fig. 3. They are made with an offset, so as to partly set over the hub, and are provided with a chamber, $c$, with a lid, $c^2$, for containing a lubricator. These boxes are secured inside the frame A, one on each side of the hub of the wheel B, as seen in Fig. 2, a stout pin, $b$, passing through both boxes, and the hub forms the journal, on which the wheel turns. The boxes C C have ears $e$ $e$, by which they are bolted to the frame. Two of the frames A are united by cross-bars D D by clamp-plates and bolts E E, and thus a simple strong truck is formed, dispensing entirely with axles.

The boxes as constructed form admirable lubricating-boxes. As they set partly over the hubs they deposit the lubricator directly onto the journal, and prevent a great deal of waste, and require filling less frequently.

The body of the car or wagon may be placed on the cross-bars, and for street-cars suitable springs may be put between the truck and the car-body.

I am aware that car-trucks have been before made of independent but united frames to receive one wheel or more, and I do not desire to claim such broadly; but

Having thus described my invention, what I claim is—

In a railway-car truck, the wheels B supported by pins $b$, in combination with the boxes C made with offsets to cover the hub of the wheel, and provided with an oil-chamber, $c$, and lid $c^2$, substantially as and for the purpose described.

J. A. ANDERSON.

Witnesses:
GEO. W. TIBBITTS,
M. ROGERS.